(12) United States Patent
Han et al.

(10) Patent No.: US 8,724,607 B2
(45) Date of Patent: May 13, 2014

(54) METHOD AND APPARATUS FOR DOWNLINK TRANSMISSION BASED ON MIMO PRECODING IN WIRELESS COMMUNICATION SYSTEM EMPLOYING DISTRIBUTED ANTENNA SYSTEMS

(75) Inventors: Jin Kyu Han, Seoul (KR); Cheol Mun, Gyeonggi-do (KR); Sung Tae Kim, Gyeonggi-do (KR); Youn Sun Kim, Gyeonggi-do (KR); Jong Kwan Yook, Seoul (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 75 days.

(21) Appl. No.: 13/371,935

(22) Filed: Feb. 13, 2012

(65) Prior Publication Data

US 2012/0207145 A1 Aug. 16, 2012

(30) Foreign Application Priority Data

Feb. 11, 2011 (KR) .................. 10-2011-0012217

(51) Int. Cl.
*H04B 7/216* (2006.01)
(52) U.S. Cl.
USPC ............ 370/342; 370/203; 370/252; 370/329

(58) Field of Classification Search
None
See application file for complete search history.

(56) References Cited

U.S. PATENT DOCUMENTS

| | | | | |
|---|---|---|---|---|
| 2004/0152415 | A1* | 8/2004 | Anagnos | 455/25 |
| 2008/0192718 | A1* | 8/2008 | Jongren et al. | 370/342 |
| 2009/0034639 | A1* | 2/2009 | Hwang et al. | 375/260 |
| 2009/0279631 | A1* | 11/2009 | Chen et al. | 375/267 |
| 2010/0238913 | A1* | 9/2010 | Xia et al. | 370/342 |
| 2012/0069833 | A1* | 3/2012 | Molnar | 370/342 |

* cited by examiner

*Primary Examiner* — David Oveissi
(74) *Attorney, Agent, or Firm* — The Farrell Law Firm, P.C.

(57) ABSTRACT

A transmission method and apparatus utilizing Multiple-Input and Multiple-Output (MIMO) precoding based on Distributed Antenna Systems (DASs) are provided. The transmission method includes determining active antenna ports, for a User Equipment (UE) having multiple receive antennas, from among a plurality of Distributed Antenna Ports (DAPs) evenly placed in a service area; assigning a Multiple-Input and Multiple-Output (MIMO) mode to the UE and notifying the UE of the MIMO mode assignment; determining a signal precoding vector on a basis of feedback information for the MIMO mode received from the UE; and precoding a signal using the signal precoding vector and transmitting the precoded signal through the active antenna ports.

18 Claims, 7 Drawing Sheets

| Codebook Index | NUMBER OF LAYERS TO BE SIMULTANEOUSLY TRANSMITTED | | | |
|---|---|---|---|---|
| | 1 | 2 | 3 | 4 |
| 0 | $\begin{bmatrix}1\\0\\0\\0\end{bmatrix}$ | $\frac{1}{\sqrt{2}}\begin{bmatrix}1&0\\0&1\\0&0\\0&0\end{bmatrix}$ | $\frac{1}{\sqrt{3}}\begin{bmatrix}1&0&0\\0&1&0\\0&0&1\\0&0&0\end{bmatrix}$ | $\frac{1}{2}\begin{bmatrix}1&0&0&0\\0&1&0&0\\0&0&1&0\\0&0&0&1\end{bmatrix}$ |
| 1 | $\begin{bmatrix}0\\1\\0\\0\end{bmatrix}$ | $\frac{1}{\sqrt{2}}\begin{bmatrix}1&0\\0&0\\0&1\\0&0\end{bmatrix}$ | $\frac{1}{\sqrt{3}}\begin{bmatrix}1&0&0\\0&1&0\\0&0&0\\0&0&1\end{bmatrix}$ | |
| 2 | $\begin{bmatrix}0\\0\\1\\0\end{bmatrix}$ | $\frac{1}{\sqrt{2}}\begin{bmatrix}1&0\\0&0\\0&0\\0&1\end{bmatrix}$ | $\frac{1}{\sqrt{3}}\begin{bmatrix}1&0&0\\0&0&0\\0&1&0\\0&0&1\end{bmatrix}$ | |
| 3 | $\begin{bmatrix}0\\0\\0\\1\end{bmatrix}$ | $\frac{1}{\sqrt{2}}\begin{bmatrix}0&0\\1&0\\0&1\\0&0\end{bmatrix}$ | | |
| 4 | | $\frac{1}{\sqrt{2}}\begin{bmatrix}0&0\\1&0\\0&0\\0&1\end{bmatrix}$ | | |
| 5 | | $\frac{1}{\sqrt{2}}\begin{bmatrix}0&0\\0&0\\1&0\\0&1\end{bmatrix}$ | | |

FIG. 2

| | NCI-DAP MIMO MODE | CI-DAP MIMO MODE |
|---|---|---|
| NUMBER OF DAPS PARTICIPATING IN TRANSMISSION OF ONE LAYER | 1 | 2 OR MORE |
| NEEDED FEEDBACK INFORMATION | ACTIVE DAP SET, INTRA-DAP CHANNEL STATE INFORMATION, CQI INFORMATION | ACTIVE DAP SET, INTRA-DAP CHANNEL STATE INFORMATION, CQI INFORMATION, INTER-DAP CHANNEL STATE INFORMATION |
| USED INTER-DAP PRECODING VECTOR CODEBOOK | FIG. 3, FIG. 4, FIG. 5 | CODEBOOK DESIGNED TO COMPENSATE FOR DIFFERENCES IN AVERAGE CHANNEL GAINS BETWEEN DAPS AND FOR DIFFERENCES IN GAINS AND PHASES OF INSTANTANEOUS |

FIG. 3

| Codebook Index | NUMBER OF LAYERS TO BE SIMULTANEOUSLY TRANSMITTED | |
| --- | --- | --- |
| | 1 | 2 |
| 0 | $\begin{bmatrix}1\\0\end{bmatrix}$ | $\frac{1}{\sqrt{2}}\begin{bmatrix}1 & 0\\0 & 1\end{bmatrix}$ |
| 1 | $\begin{bmatrix}0\\1\end{bmatrix}$ | |

FIG. 4

| Codebook Index | NUMBER OF LAYERS TO BE SIMULTANEOUSLY TRANSMITTED | | |
|---|---|---|---|
| | 1 | 2 | 3 |
| 0 | $\begin{bmatrix}1\\0\\0\end{bmatrix}$ | $\frac{1}{\sqrt{2}}\begin{bmatrix}1&0\\0&1\\0&0\end{bmatrix}$ | $\frac{1}{\sqrt{3}}\begin{bmatrix}1&0&0\\0&1&0\\0&0&1\end{bmatrix}$ |
| 1 | $\begin{bmatrix}0\\1\\0\end{bmatrix}$ | $\frac{1}{\sqrt{2}}\begin{bmatrix}1&0\\0&0\\0&1\end{bmatrix}$ | |
| 2 | $\begin{bmatrix}0\\0\\1\end{bmatrix}$ | $\frac{1}{\sqrt{2}}\begin{bmatrix}0&0\\1&0\\0&1\end{bmatrix}$ | |

FIG. 5

| Codebook Index | Number of Layers to be Simultaneously Transmitted | | | |
|---|---|---|---|---|
| | 1 | 2 | 3 | 4 |
| 0 | $\begin{bmatrix}1\\0\\0\\0\end{bmatrix}$ | $\frac{1}{\sqrt{2}}\begin{bmatrix}1 & 0\\0 & 1\\0 & 0\\0 & 0\end{bmatrix}$ | $\frac{1}{\sqrt{3}}\begin{bmatrix}1 & 0 & 0\\0 & 1 & 0\\0 & 0 & 1\\0 & 0 & 0\end{bmatrix}$ | $\frac{1}{2}\begin{bmatrix}1 & 0 & 0 & 0\\0 & 1 & 0 & 0\\0 & 0 & 1 & 0\\0 & 0 & 0 & 1\end{bmatrix}$ |
| 1 | $\begin{bmatrix}0\\1\\0\\0\end{bmatrix}$ | $\frac{1}{\sqrt{2}}\begin{bmatrix}1 & 0\\0 & 0\\0 & 1\\0 & 0\end{bmatrix}$ | $\frac{1}{\sqrt{3}}\begin{bmatrix}1 & 0 & 0\\0 & 1 & 0\\0 & 0 & 0\\0 & 0 & 1\end{bmatrix}$ | |
| 2 | $\begin{bmatrix}0\\0\\1\\0\end{bmatrix}$ | $\frac{1}{\sqrt{2}}\begin{bmatrix}1 & 0\\0 & 0\\0 & 0\\0 & 1\end{bmatrix}$ | $\frac{1}{\sqrt{3}}\begin{bmatrix}1 & 0 & 0\\0 & 0 & 0\\0 & 1 & 0\\0 & 0 & 1\end{bmatrix}$ | |
| 3 | $\begin{bmatrix}0\\0\\0\\1\end{bmatrix}$ | $\frac{1}{\sqrt{2}}\begin{bmatrix}0 & 0\\1 & 0\\0 & 1\\0 & 0\end{bmatrix}$ | | |
| 4 | | $\frac{1}{\sqrt{2}}\begin{bmatrix}0 & 0\\1 & 0\\0 & 0\\0 & 1\end{bmatrix}$ | | |
| 5 | | $\frac{1}{\sqrt{2}}\begin{bmatrix}0 & 0\\0 & 0\\1 & 0\\0 & 1\end{bmatrix}$ | | |

METHOD AND APPARATUS FOR DOWNLINK TRANSMISSION BASED ON MIMO PRECODING IN WIRELESS COMMUNICATION SYSTEM EMPLOYING DISTRIBUTED ANTENNA SYSTEMS

PRIORITY

This application claims priority under 35 U.S.C. §119(a) to an application filed in the Korean Intellectual Property Office on Feb. 11, 2011, and assigned Serial No. 10-2011-0012217, the contents of which are incorporated herein by reference.

BACKGROUND OF THE INVENTION

1. Field of the Invention

The present invention relates to generally to a method and apparatus for data transmission and reception, and more particularly, to a method and apparatus for data transmission and reception utilizing Multiple-Input and Multiple-Output (MIMO) precoding based on Distributed Antenna Systems.

2. Description of the Related Art

In a Distributed Antenna System (DAS), the Central Processing Unit (CPU) for processing signals is connected through wired/wireless networks with transmit antennas evenly distributed within an entire cell so that a User Equipment (UE) may form a virtual cell together with multiple nearby transmit antennas. Due to a distribution of transmit antennas over a wide area, a DAS may provide an advantage of macroscopic diversity, as well as provide high-speed and high-quality communication services to UEs located on cell boundaries. The DAS may increase system capacity by decreasing inter-cell interference through a reduction of transmit power of individual transmit antennas. Hence, distributed antenna systems are expected to be a core technology in next-generation wireless communication systems.

In the event that the CPU is connected with M (spatially distributed) Distributed Antenna Ports (DAP), where M is the number of ports, and each DAP is associated with $n_T$ transmit antennas, downlink data generated by the CPU may be transmitted simultaneously through $Mn_T$ transmit antennas. A receiver may receive signals using multiple receive antennas. Accordingly, a DAS may contribute to effective downlink transmission through Multiple-Input/Multiple-Output (MIMO) technology.

DAS channel environments are significantly different from channel environments of existing co-located MIMO channels. In particular, as propagation paths between a UE and DAPs in one cell are very different, a significant difference is present between average channel gains with respect to the different DAPs. In addition, channels between transmit antennas of the same DAP and a UE are correlated, while channels between transmit antennas of different DAPs and a UE are uncorrelated. Accordingly, both correlated and uncorrelated channel conditions may coexist in DAS channel environments. As existing MIMO precoding schemes may be inadequate for DAS channel environments, there is a need for a new MIMO precoding scheme suitable to DAS channel environments. In order to achieve effective DAS-based downlink data transmission, a new MIMO precoding scheme adequate for DAS channel properties is needed.

SUMMARY OF THE INVENTION

The present invention has been made in view of the above problems and the present invention provides a data transmission method and apparatus that are optimized to DAS downlink channel properties so as to achieve efficient and high-speed MIMO transmission using a minimum amount of feedback information.

In accordance with an aspect of the present invention, a transmission method for a base station in a wireless communication system is provided. The transmission method includes determining active antenna ports, for a User Equipment (UE) having multiple receive antennas, from among a plurality of Distributed Antenna Ports (DAPs) evenly placed in a service area; assigning a Multiple-Input and Multiple-Output (MIMO) mode to the UE and notifying the UE of the MIMO mode assignment; determining a signal precoding vector on a basis of feedback information for the MIMO mode received from the UE; and precoding a signal using the signal precoding vector and transmitting the precoded signal through the active antenna ports.

In accordance with another aspect of the present invention, a transmission apparatus for a base station in a wireless communication system is provided. The transmission apparatus includes a plurality of distributed antenna ports evenly placed in a service area for transmitting signals; a port determiner for determining active antenna ports, for a User Equipment (UE) having multiple receive antennas located in the service area, from among the distributed antenna ports; a mode determiner for assigning a Multiple-Input and Multiple-Output (MIMO) mode to the UE for communication and notifying the UE of the MIMO mode assignment; a vector determiner for determining a precoding vector on a basis of feedback information for the MIMO mode received from the UE; and a plurality of precoders, such that each of the plurality of precoders precodes a signal to be transmitted through active antenna ports using a signal precoding vector.

In accordance with another aspect of the present invention, a reception method for a User Equipment (UE) having multiple receive antennas in a wireless communication system is provided. The reception method includes sharing, with a base station, information regarding active antenna ports, selected from among a plurality of Distributed Antenna Ports (DAPs) evenly placed in a service area; transmitting, after receiving a notification of a Multiple-Input and Multiple-Output (MIMO) mode for communication from the base station, feedback information for the MIMO mode to the base station; and receiving, from the base station, a signal, which is precoded using a signal precoding vector determined according to the feedback information and sent through the active antenna ports.

In accordance with another aspect of the present invention, a reception apparatus for a User Equipment (UE) in a wireless communication system is provided. The reception apparatus includes a control unit for sharing, with a base station, information regarding active antenna ports, selected from among many Distributed Antenna Ports (DAPs) evenly placed in a service area; a transmission unit transmitting, to the base station, after receiving a notification of a Multiple-Input and Multiple-Output (MIMO) mode for communication from the base station, feedback information for the MIMO mode; and a plurality of receive antennas each receiving a signal from the base station under a control of, such that the signal is precoded using a signal precoding vector determined according to the feedback information and sent through the active antenna ports.

BRIEF DESCRIPTION OF THE DRAWINGS

The features and advantages of the present invention will be more apparent from the following detailed description in conjunction with the accompanying drawings, in which:

FIG. 2 is a table illustrating results of comparison between two proposed MIMO modes according to an embodiment of the present invention;

FIG. 3 is a table illustrating a codebook of inter-DAP precoding vectors for the non-cooperative DAP MIMO mode when there are two active DAPs, according to an embodiment of the present invention;

FIG. 4 is a table illustrating a codebook of inter-DAP precoding vectors for the non-cooperative DAP MIMO mode when there are three active DAPs, according to an embodiment of the present invention;

FIG. 5 is a table illustrating a codebook of inter-DAP precoding vectors for the non-cooperative DAP MIMO mode when there are four active DAPs, according to an embodiment of the present invention;

DETAILED DESCRIPTION OF EMBODIMENTS OF THE PRESENT INVENTION

Figure 1:
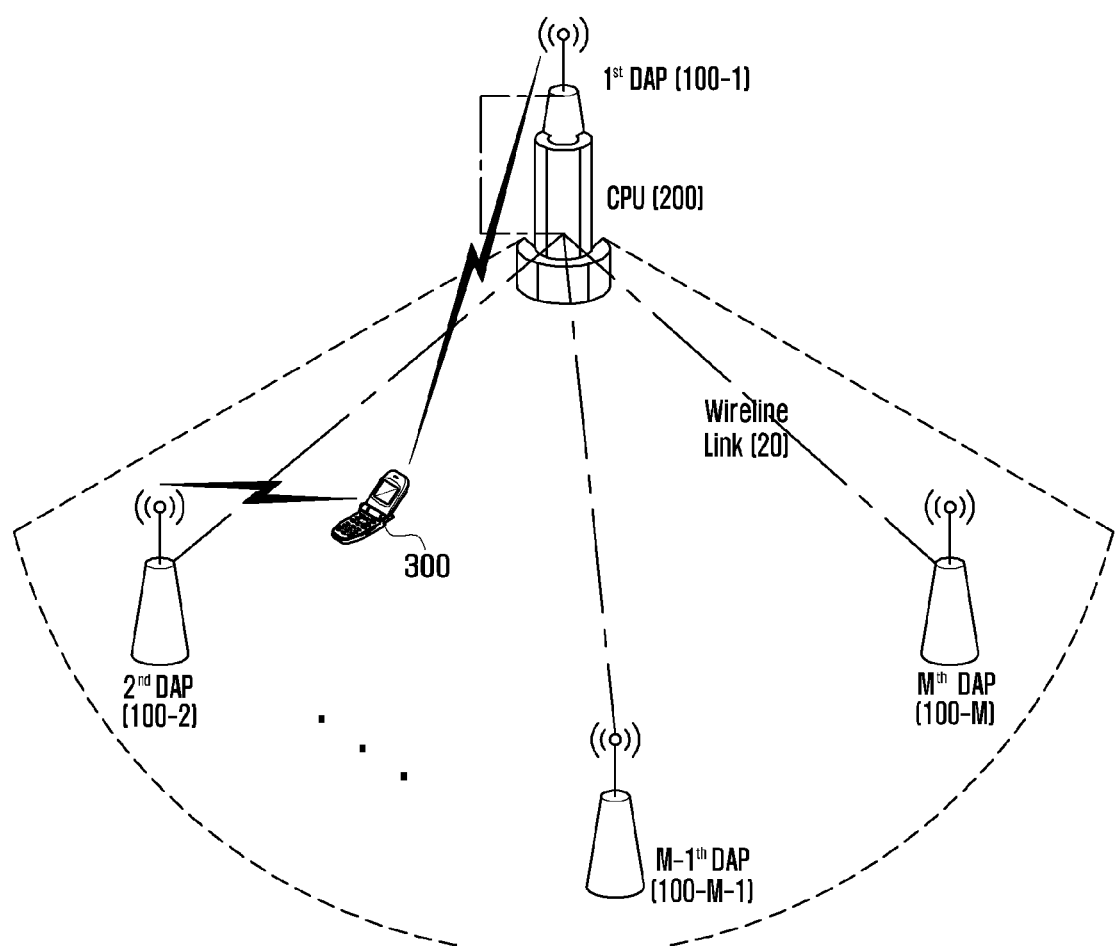
FIG. 1 is a diagram illustrating a configuration of a Distributed Antenna System (DAS) according to an embodiment of the present invention.

Embodiments of the present invention are described in detail as follows with reference to the accompanying drawings. The same or similar components may be designated by the same or similar reference numerals although they are illustrated in different drawings. Detailed descriptions of constructions or processes well known in the art functions and structures incorporated herein may be omitted to avoid obscuring the subject matter of the present invention.

A. MIMO Technology for a Distributed Antenna System

In a DAS, transmit antennas of a transmitter are spatially distributed in a service area.

FIG. 1 illustrates a configuration of a distributed antenna system according to an embodiment of the present invention.

Referring to FIG. 1, in the present example, is assumed that M DAPs 100-1, 100-2, . . . 100-M-1, 100-M are evenly distributed in a single cell, the CPU 200 of the base station is connected with the M DAPs 100-1 through 100-M via wireline links such as wireline link 20 through high-speed wired backhaul networks, each DAP is associated with $n_T$ transmit antennas, and each of K UEs 300 located in the cell has $n_R$ receive antennas.

As downlink data generated by the CPU 200 is transmitted from all $Mn_T$ transmit antennas and received by a receiver using $n_R$ receive antennas, downlink data may be transmitted through a MIMO transmission scheme. Here, in order to precode L layers, the transmitter uses a precoding matrix $F^{(L)}$ of a size $Mn_T \times L$. According to embodiments of the present invention, the precoding matrix $F^{(L)}$ for transmission may be written in a hierarchical form as in Equation (1) below:

$$F^{(L)} = [f_1 \; f_2 \; \cdots \; f_L] \quad \text{Equation (1)}$$

$$= \begin{bmatrix} c_{1,1}p_1 & c_{1,2}p_1 & \cdots & c_{1,L}p_1 \\ c_{2,1}p_2 & c_{2,2}p_2 & \cdots & c_{2,L}p_2 \\ \vdots & \vdots & \ddots & \vdots \\ c_{M,1}p_M & c_{M,2}p_M & \cdots & c_{M,L}p_M \end{bmatrix}$$

$$= \begin{bmatrix} c_{1,1} & c_{1,2} & \cdots & c_{1,L} \\ c_{2,1} & c_{2,2} & \cdots & c_{2,L} \\ \vdots & \vdots & \ddots & \vdots \\ c_{M,1} & c_{M,2} & \cdots & c_{M,L} \end{bmatrix} \odot \begin{bmatrix} p_1 \\ p_2 \\ \vdots \\ p_M \end{bmatrix}$$

$$= C \odot P$$

In the precoding matrix $F^{(L)}$, the precoding vector $f_1$ of a size $Mn_T \times 1$ is used for precoding of the 1st layer. The intra-DAP precoding vector $p_m$ of a size $n_T \times 1$ for $n_T$ transmit antennas associated with the m-th DAP is multiplied respectively by a real or complex number $c_{m,1}$ for compensating for channel differences between DAPs to produce $f_1$. A vector $c_1 = [c_{1,1} \; c_{2,1} \ldots c_{M,1}]^T$ of a size $M \times 1$ with M elements $\{c_{m,1}\}_{m=1,\ldots M}$ is the inter-DAP precoding vector for compensating for channel differences between DAPs in precoding of the 1st layer. Accordingly, the precoding matrix $F^{(L)}$ of a size $Mn_T \times L$ for precoding of L layers is determined by a matrix operation between the inter-DAP precoding matrix C of a size $L \times M$ and the intra-DAP precoding matrix P of a size $Mn_T \times 1$.

The intra-DAP precoding vector $p_m$ is determined by the base station (e.g., an evolved Node B (eNodeB)) on the basis of feedback information on states of intra-DAP downlink channels from the m-th DAP to a specific UE. The intra-DAP precoding matrix may be determined using existing Long Term Evolution (LTE) codebooks and MIMO technology.

The inter-DAP precoding vector $c_1$ is used to compensate for channel differences between DAPs and closely imitates channel states between a UE and DAPs. Properties of channels between a UE and DAPs (i.e., inter-DAP channel properties) are significantly different from intra-DAP channel properties in that average channel gains between a UE and DAPs are very different and spatial fading correlation is very low. Accordingly, it is difficult to apply existing LTE MIMO schemes to determination of the inter-DAP precoding vector $c_1$. According to embodiments of the present invention, in order to implement a DAS MIMO operation, an inter-DAP MIMO mode is newly defined, and corresponding feedback channel information and a precoding vector codebook are proposed.

According to embodiments of the present invention, in order to implement a MIMO operation suitable to DAS downlink channel properties, a Non-Cooperative Inter-DAP (NCI-DAP) MIMO mode and Cooperative Inter-DAP (CI-DAP) MIMO mode are proposed as MIMO operation modes for communication between the eNodeB and a UE. In addition, embodiments of the present invention include a scheme for determining a MIMO mode for a specific UE by the eNodeB in consideration of channel states of each UE and distribution of UEs in the cell.

The NCI-DAP MIMO mode is a basis one of inter-DAP MIMO modes suitable for inter-DAP channel properties, namely, significantly different average channel gains between a UE and DAPs, and very low spatial fading correlation. In the NCI-DAP MIMO mode, only one of multiple DAPs is selected for transmission. In detail, a single layer signal is transmitted by only one DAP in the NCI-DAP MIMO mode. The NCI-DAP MIMO mode exhibits excellent performance when a wide variation is present in average channel gains between DAPs (i.e., when the average channel gain of one DAP is much greater than the channel gains of the other DAPs).

In the CI-DAP MIMO mode, as average channel gains between a UE and DAPs are significantly different and spatial fading correlation is very low, inter-DAP precoding is performed in order to compensate for channel differences between DAPs, and one layer signal is simultaneously transmitted by at least two DAPs. The CI-DAP MIMO mode exhibits excellent performance when a small variation is present in average channel gains between DAPs (i.e., when average channel gains of multiple DAPs are similar).

The table of FIG. 2 illustrates results of a comparison between the NCI-DAP MIMO mode and the CI-DAP MIMO mode in terms of necessary feedback information and codebook properties.

B. Use of Inter-DAP MIMO in DAS MIMO Schemes

Embodiments of the present invention may include a scheme for determining one of the NCI-DAP MIMO mode and the CI-DAP MIMO mode for a specific UE by the eNodeB in consideration of channel states of each UE and distribution of user equipments in the cell.

As only one of multiple DAPs is selected for transmission, the NCI-DAP MIMO mode exhibits excellent performance when a wide variation is present in average channel gains between DAPs (i.e., when the average channel gain of one DAP is much greater than those of the other DAPs). As one DAP transmits a single layer in the NCI-DAP MIMO mode, it is necessary to select a UE to which a layer is to be transmitted by each DAP. In order to obtain advantageous multiuser diversity, there should be a large number of UEs that have channel states good enough to receive data from DAPs. Accordingly, the eNodeB assigns the NCI-DAP MIMO mode to a UE at which the average channel gain of one DAP is much greater than the channel gains of the other DAPs, and notifies the UE of the assignment through the downlink control channel. In addition, when the number of UEs to which individual DAPs may transmit data is sufficiently large, the eNodeB assigns the NCI-DAP MIMO mode to those UEs that may receive data from corresponding DAPs, and notifies the UEs of the assignment through the downlink control channel.

In the CI-DAP MIMO mode, inter-DAP precoding is performed in order to compensate for channel differences between DAPs, and one layer is simultaneously transmitted by at least two DAPs. The CI-DAP MIMO mode exhibits excellent performance when average channel gains of DAPs simultaneously transmitting the same layer are similar. As multiple DAPs transmit a single layer in the CI-DAP MIMO mode, when the number of UEs to which individual DAPs may transmit data is not sufficiently large, it is possible to select a UE to which a layer is to be transmitted by multiple DAPs. Hence, the eNodeB assigns the CI-DAP MIMO mode to a UE at which average channel gains of multiple DAPs are similar, and notifies the UE of the assignment through the downlink control channel.

In addition, the eNodeB assigns the CI-DAP MIMO mode to those UEs that may receive data from DAPs that do not have a sufficient number of UEs to which the DAPs may transmit data, and notifies the UEs of the assignment through the downlink control channel.

C. Non-Cooperative Inter-DAP MIMO Mode

In the NCI-DAP MIMO mode, the eNodeB receives, as feedback information from a UE, information on the active DAP set, intra-DAP channel state information of DAPs in the active DAP set, and downlink Channel Quality Indicator (CQI) information from DAPs in the active DAP set to the UE.

An active DAP set for a UE is formed by selecting DAPs having channel states sufficient to influence performance of downlink data transmission to the UE. Formation of an active DAP set $A_k$ and sharing thereof between the eNodeB and UE are described in detail herein, in section E, entitled "Determination and Sharing of Active DAP Set".

Regarding intra-DAP channel state information, for DAPs in the active DAP set $A_k$, the UE estimates states of downlink channels between $n_T$ transmit antennas of a DAP to $n_R$ receive antennas of the UE, quantizes the estimation result, and feeds back the quantized estimation result to the eNodeB.

CQI information indicates a Signal to Interference plus Noise Ratio (SINR) obtainable by the UE through downlink channels from a DAP in the active DAP set $A_k$. In the NCI-DAP MIMO mode, the UE estimates an SINR using Equation (2), and feeds back the estimated SINR to the eNodeB. Herein, for ease of description, each DAP is assumed to have one transmit antenna (that is, $n_T=1$).

$$\gamma_{k,m} = \frac{|h_{k,m}|^2}{\sum_{i \neq m, i \in A_k} |h_{k,i}|^2 + N_o}, \ m \in A_k \qquad \text{Equation (2)}$$

In the above Equation (2), $\gamma_{k,m}$ indicates an SINR obtainable by a k-th UE through an m-th DAP belonging to the active DAP set $A_k$, $h_{k,m}$ indicates a channel coefficient depicting pathloss and shadow fading from the m-th DAP belonging to the active DAP set $A_k$ to the k-th UE. During SINR estimation, it is assumed that the UE receives a signal from one DAP in $A_k$ and receives interference signals from the remaining DAPs in $A_k$. More specifically, as the signals received by a UE from the remaining DAPs in $A_k$ are signals that have been transmitted by the remaining DAPs to other UEs, the signals from the remaining DAPs are regarded an interference signal to the UE.

In the NCI-DAP MIMO mode, on the basis of feedback information including information on the active DAP set, intra-DAP channel state information and CQI information, the precoding matrix F given in Equation (1) is determined for precoding of layers to be transmitted. The eNodeB determines the intra-DAP precoding vector $\{p_m\}_{m \in A_k}$ in Equation (1) on the basis of intra-DAP channel state information for DAPs in the active DAP set and forms the precoding matrix F as in Equation (3). For example, assume that four DAPs with indices m=1, 2, 3, 4 are present and the active DAP set for a k-th UE is $A_k=\{2,3\}$. Then, the precoding matrix $F^{(1)}$ (when the number of layers to be transmitted is one) and the precoding matrix $F^{(2)}$ (when the number of layers is two) are computed, based on the Equation (1), as shown in the following Equation (3):

$$F^{(1)} = \begin{bmatrix} 0 \\ c_{2,1} \\ c_{3,1} \\ 0 \end{bmatrix} \odot \begin{bmatrix} 0 \\ p_2 \\ p_3 \\ 0 \end{bmatrix}, \ C_A^{(1)} = \begin{bmatrix} c_{2,1} \\ c_{3,1} \end{bmatrix} \qquad \text{Equation (3)}$$

$$F^{(2)} = \begin{bmatrix} 0 & 0 \\ c_{2,1} & c_{2,2} \\ c_{3,1} & c_{3,2} \\ 0 & 0 \end{bmatrix} \odot \begin{bmatrix} 0 \\ p_2 \\ p_3 \\ 0 \end{bmatrix}, \ C_A^{(2)} = \begin{bmatrix} c_{2,1} & c_{2,2} \\ c_{3,1} & c_{3,2} \end{bmatrix}$$

In Equation (3), $C_A^{(1)}$ and $C_A^{(2)}$ are the inter-DAP precoding matrix for active DAPs in the active DAP set $A_k=\{2,3\}$ when the numbers of layers to be simultaneously transmitted are one and two, respectively. The eNodeB selects one of $C_A^{(1)}$ and $C_A^{(2)}$ according to the number of layers to be simultaneously transmitted from the codebook of inter-DAP precoding vectors as shown in the table of FIG. 3, and computes one of the precoding matrices $F^{(1)}$ and $F^{(2)}$ as in Equation (4).

For example, when the number of layers is 1 and a codebook index of 0 is selected, $C_A^{(1)}$ becomes $[1\ 0]^T$, and the precoding matrix $F^{(1)}$ is computed as shown in Equation (4), as follows:

$$F^{(1)} = \left(\frac{1}{\sqrt{2}}\begin{bmatrix}0\\1\\0\\0\end{bmatrix}\right) \odot \begin{bmatrix}0\\p_2\\p_3\\0\end{bmatrix} = \begin{bmatrix}0\\p_2\\0\\0\end{bmatrix} \qquad \text{Equation (4)}$$

As shown in Equation (4), at the DAP with the first index (m=2) in the active DAP set $A_k$, one layer is multiplied by the intra-DAP precoding vector $p_2$ and sent to the corresponding UE. As another example, when the number of layers is two and a codebook index of 0 is selected, $C_A^{(2)}$ is computed as in Equation (5) (indicated by a square), as follows:

$$F^{(2)} = \left(\frac{1}{\sqrt{2}}\begin{bmatrix}0&0\\1&0\\0&1\\0&0\end{bmatrix}\right) \odot \begin{bmatrix}0\\p_2\\p_3\\0\end{bmatrix} = \frac{1}{\sqrt{2}}\begin{bmatrix}0&0\\p_2&0\\0&p_3\\0&0\end{bmatrix} \qquad \text{Equation (5)}$$

As shown in Equation (5), at the DAP with the first index (m=2) in the active DAP set $A_k$, one layer is multiplied by the intra-DAP precoding vector $p_2/\sqrt{2}$ and sent to the corresponding UE; and at the DAP with the second index (m=3) in the active DAP set $A_k$, another layer is multiplied by the intra-DAP precoding vector $p_3/\sqrt{2}$ and sent to the same UE.

FIG. 4 and FIG. 5 are tables illustrating codebooks of inter-DAP precoding vectors when the number of DAPs in the active DAP set is 3 and 4, respectively, according to an embodiment of the present invention.

Figure 6:
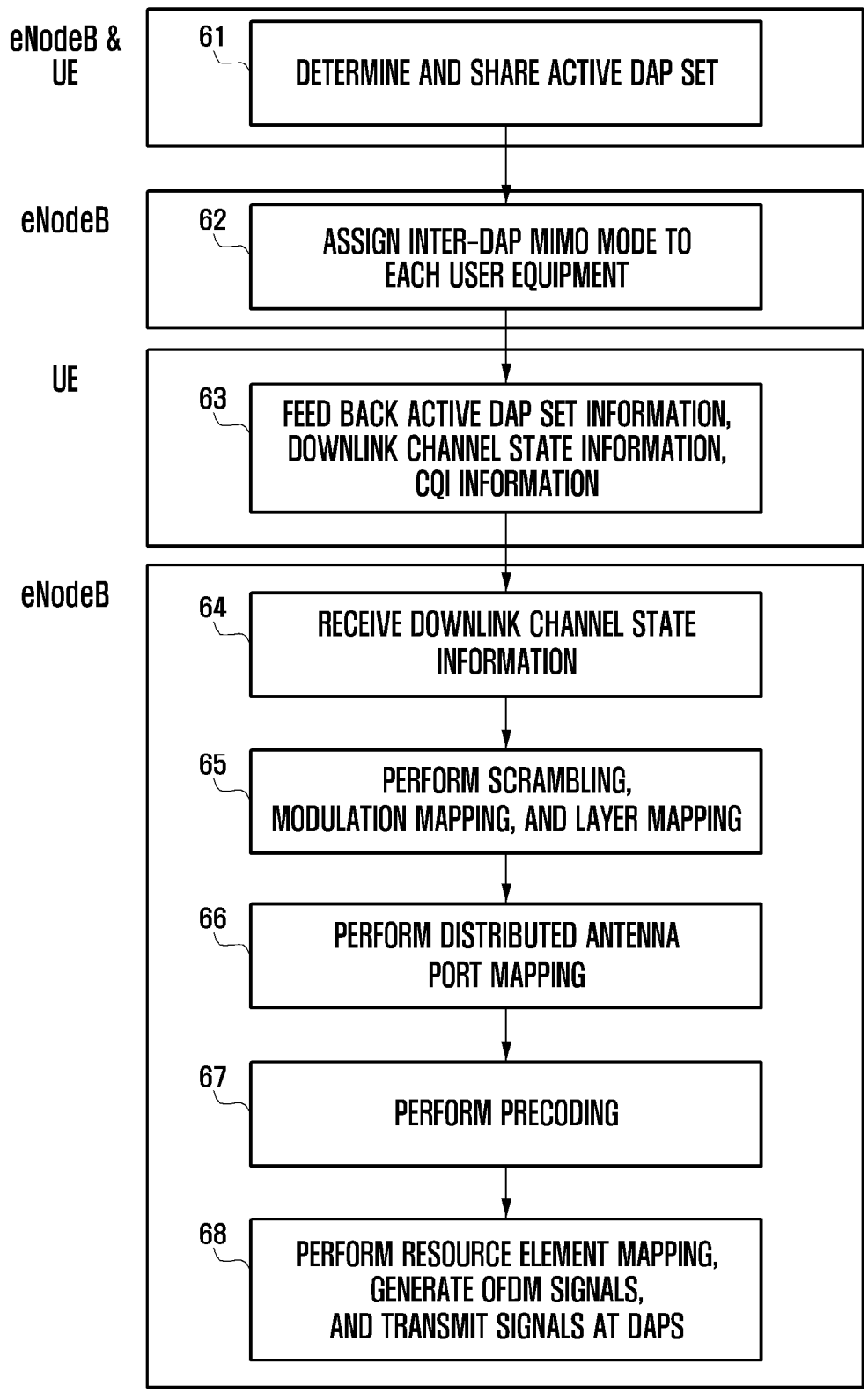
FIG. 6 is a flowchart illustrating a transmission procedure based on DAS downlink MIMO precoding according to an embodiment of the present invention.
Figure 7:
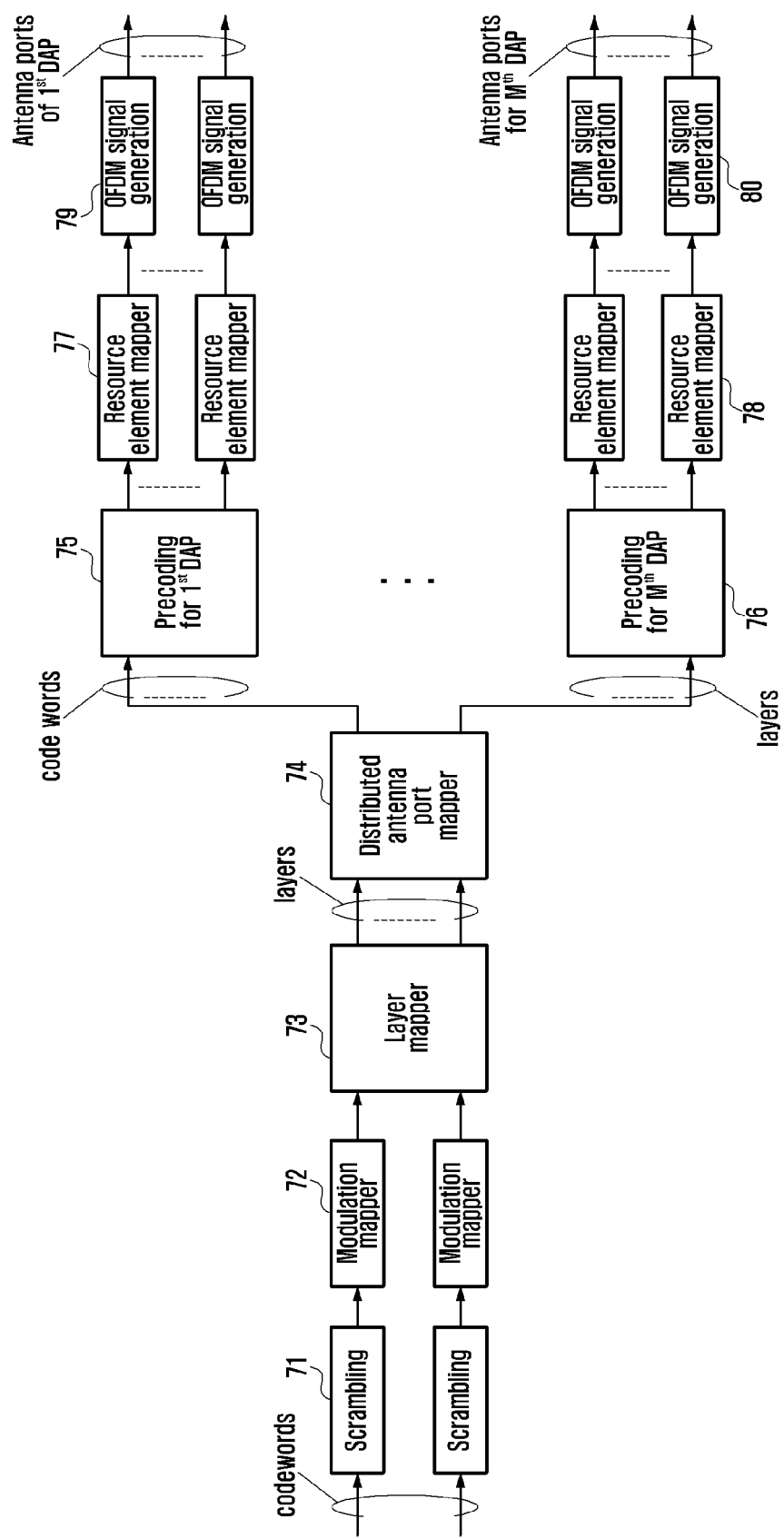
FIG. 7 is a diagram illustrating a structure of a transmitting end performing DAS downlink MIMO precoding, according to an embodiment of the present invention.

FIG. 6 is a flowchart illustrating a transmission procedure performed in the NCI-DAP MIMO mode according to an embodiment of the present invention. FIG. 7 illustrates a structure of a DAS transmitter performing NCI-DAP MIMO mode operation according to an embodiment of the present invention.

Referring to FIG. 6, the eNodeB and each UE form an active DAP set $A_k$ by selecting DAPs having channel states sufficient to influence performance of downlink data transmission among all of M DAPs, and share information on the active DAP set, in step 61. Formation of an active DAP set and sharing thereof between the eNodeB and UE according to an embodiment of the present invention are described herein in section E, entitled "Determination and Sharing of Active DAP Set".

The eNodeB determines an inter-DAP MIMO mode for the UE, in step 62. As described in "section B", the eNodeB determines an inter-DAP MIMO mode for each UE in consideration of channel states of UEs and distribution of UEs per DAP, and notifies the UE of the determination result through the downlink control channel. Determination of inter-DAP MIMO modes may be performed regularly according to a preset period, or irregularly performed when a change occurs in average channel gains of UEs or distribution thereof in the cell.

The UE feeds back downlink channel state information according to the inter-DAP MIMO mode assigned by the eNodeB, in step 63. When the NCI-DAP MIMO mode is used, the UE feeds information on the active DAP set, intra-DAP channel state information of DAPs in the active DAP set, and downlink CQI information from DAPs in the active DAP set to the UE back to the eNodeB.

The eNodeB receives downlink channel state information from the UE, in step 64. When the NCI-DAP MIMO mode is used, the eNodeB receives, from each UE, information on the active DAP set, intra-DAP channel state information of DAPs in the active DAP set, and downlink CQI information from DAPs in the active DAP set to the UE.

The eNodeB performs scheduling on the basis of downlink CQI information, and performs scrambling, modulation mapping, and layer mapping on data to be sent to the scheduled UE, in step 65. This process is performed by a scrambler 71, a modulation mapper 72, and a layer mapper 73, as shown in FIG. 7.

FIG. 7 is a diagram illustrating a structure of a transmitting end performing DAS downlink MIMO precoding according to an embodiment of the present invention.

Referring to FIGS. 6 and 7, the eNodeB maps layers for the UE to DAPs belonging to the active DAP set with reference to indices of the active DAP set, in step 66. Layer-to-DAP mapping is performed by a DAP mapper 74 in FIG. 7.

The eNodeB performs precoding on layers mapped to DAPs, in step 67. Each precoder 75 or 76 in FIG. 7 performs precoding on the layer mapped to the corresponding DAP. In the present example, on the basis of intra-DAP channel state information fed back by a UE to which a layer is to be sent, the intra-DAP precoding vector $p_m$ is determined. The intra-DAP precoding vector $p_m$ is multiplied by an element $c_{m,1}$ of the inter-DAP precoding vector $c_1$, and the layer is multiplied by the precoding vector $c_{m,1}p_m$. When $c_{m,1}$ is zero, precoding is not actually performed at the m-th DAP. When the NCI-DAP MIMO mode is used, since one value of $c_{m,1}$ is non-zero for each layer, one layer is precoded and transmitted at only one DAP.

The eNodeB performs resource element mapping, generates Orthogonal Frequency Division Multiplexing (OFDM) signals and sends the generated OFDM signals, in step 68. Referring back to FIG. 7, each resource element mapper 77 or 78 maps precoded symbols to a resource grid assigned to the corresponding DAP. Each OFDM signal generator 79 or 80 generates an OFDM signal, which is transmitted by the corresponding DAP.

D. Cooperative Inter-DAP MIMO Mode

In the CI-DAP MIMO mode, inter-DAP precoding is performed in order to compensate for channel differences between DAPs, and one layer signal is simultaneously transmitted by at least two DAPs. In performing this inter-DAP precoding in the CI-DAP MIMO mode, the eNodeB collects, for a UE, feedback information such as information on the active DAP set, information on intra-DAP channel states of DAPs in the active DAP set, downlink CQI information from DAPs in the active DAP set to the UE, and inter-DAP channel state information. Compared to the NCI-DAP MIMO mode, the CI-DAP MIMO mode additionally requires feedback of inter-DAP channel state information.

For a UE, inter-DAP channel state information (needed only for the CI-DAP MIMO mode) indicates properties of channels between the UE and DAPs belonging to the active DAP set $A_k$, and includes information regarding average channel gains between the UE and active DAPs and instantaneous complex channel gains therebetween.

The average channel gains between the UE and active DAPs indicate the time average of channel gains $\{h_{k,m}\}_{m \in A_k}$ from active DAPs to the UE (i.e., $\{E[|h_{k,m}|]\}_{m \in A_k}$). As the average channel gain does not change significantly over long periods of time, information thereof may be fed back to the eNodeB with a sufficiently long period as long-term feedback information. Alternatively, the eNodeB may directly estimate average channel gains between the UE and active DAPs.

Instantaneous complex channel gains between the UE and active DAPs indicate division of channel gains $\{h_{k,m}\}_{m \in A_k}$ from active DAPs to the UE by the time average $\{E[|h_{k,m}|]\}_{m \in A_k}$ (namely, $\{h_{k,m}/E[|h_{k,m}|]\}_{m \in A_k}$), and follows independent identically distributed (i.i.d) complex Gaussian with mean zero and variance 1. As complex channel gains vary instantaneously with time, information thereof may be fed back with a sufficiently short period as short-term feedback information.

In the CI-DAP MIMO mode, using the above-described feedback information, the precoding matrix $F^{(L)}$ is determined for precoding of L layers to be transmitted to the k-th UE. In the CI-DAP MIMO mode, in a manner similar to that performed in the case of the NCI-DAP MIMO mode, the NodeB determines the intra-DAP precoding vector $\{p_m\}_{m \in A_k}$ on the basis of intra-DAP channel state information for DAPs in the active DAP set, and forms the precoding matrix $F^{(L)}$ composed of the intra-DAP precoding vector $\{p_m\}_{m \in A_k}$ for active DAPs as in Equation (3). The eNodeB selects one of inter-DAP precoding vectors $C_A^{(1)}$ and $C_A^{(2)}$ in Equation (3) from the codebook of inter-DAP precoding vectors designed for the CI-DAP MIMO mode, and computes the precoding matrix $F^{(L)}$ as in Equation (3).

As described in the table of FIG. 2, the inter-DAP precoding vector codebook for the CI-DAP MIMO mode should be designed so as to compensate for average channel gains $\{E[|h_{k,m}|]\}_{m \in A_k}$ and instantaneous channel gains $\{h_{k,m}/E[|h_{k,m}|]\}_{m \in A_k}$ between DAPs. In order achieve this compensation, according to an embodiment of the present invention, the inter-DAP precoding vector $C_A^{(1)}$ is represented in a form as in Equation (6), as follows:

$$C_A^{(1)} = \begin{bmatrix} c_{2,1} \\ c_{3,1} \end{bmatrix} = \begin{bmatrix} E[|h_{k,2}|] \cdot u_{2,1} \\ E[|h_{k,3}|] \cdot u_{3,1} \end{bmatrix} \quad \text{Equation (6)}$$

In the present example, it is assumed that four DAPs with indices m=1, 2, 3, 4 are present and the active DAP set for the k-th UE is $A_k=\{2,3\}$. As elements $\{c_{m,1}\}_{m \in A_k}$ of the inter-DAP precoding vector $C_A^{(1)}$ should imitate inter-DAP channel gains $\{h_{k,m}\}_{m \in A_k}$, $\{c_{m,1}\}_{m \in A_k}$ may be represented as the product $\{E[|h_{k,m}|]\}_{m \in A_k}$ of average values and instantaneous values of channel gains $\{h_{k,m}\}_{m \in A_k}$. Here, the vector $u_A^{(1)}=[u_{2,1} \ u_{3,1}]^T$ composed of instantaneous values may be replaced with values selected from a codebook uniformly quantizing a 2-dimensional complex vector space. Codebooks uniformly quantizing an n-dimensional complex vector space may be designed through random vector quantization or Grassmannian subspace packing.

When the numbers of DAPs in the active DAP set of a UE are 3 and 4, codebooks for inter-DAP precoding vectors $C_A^{(1)}$ and $C_A^{(2)}$ are respectively designed and shared between the eNodeB and each UE.

Hence, the eNodeB selects the vector $u_A^{(1)}=[u_{2,1} \ u_{3,1}]^T$ from the inter-DAP precoding vector codebook for the CI-DAP MIMO mode so that the vector obtained by multiplying each element of the precoding vector selected from the codebook and the average channel gain of the corresponding DAP, according to Equation (6) above, may imitate inter-DAP channel gains $\{h_{k,m}\}_{m \in A_k}$ in the best manner possible.

Although the above-described example with reference to FIG. 6 and FIG. 7 corresponds to an NCI-DAP MIMO mode procedure, the procedure and structure depicted in FIGS. 6 and 7 may also be applied to a transmission procedure and a structure of a transmitter for the CI-DAP MIMO mode.

Referring again to FIG. 6 with respect to a CI-DAP MIMO mode operation, step 61 and step 62 for the CI-DAP MIMO mode are identical respectively to step 61 and step 62 for the NCI-DAP MIMO mode described herein above.

The UE feeds back downlink channel state information according to the inter-DAP MIMO mode assigned by the eNodeB, in step 63. In the case of the CI-DAP MIMO mode, the UE feeds information on the active DAP set, intra-DAP channel state information of DAPs in the active DAP set, downlink CQI information from DAPs in the active DAP set to the UE, and instantaneous complex channel information from DAPs in the active DAP set to the UE back to the eNodeB.

The eNodeB receives downlink channel state information from the UE, in step 64. In the case of the CI-DAP MIMO mode, the eNodeB receives, in addition to feedback information necessary for the NCI-DAP MIMO mode, instantaneous complex channel information from DAPs in the active DAP set to the UE.

Step 65 and step 66 for the CI-DAP MIMO mode are identical respectively to step 65 and step 66 for the NCI-DAP MIMO mode described herein above.

The eNodeB performs precoding on layers mapped to DAPs, in step 67. In the CI-DAP MIMO mode, a vector, which best imitates inter-DAP channel gains after being multiplied by the average channel gain of the DAP, such as in Equation 6, is selected from the inter-DAP precoding vector codebook for the CI-DAP MIMO mode. Elements of the selected vector are multiplied by average channel gains of corresponding DAPs, and the result is multiplied by the intra-DAP precoding vector $p_m$ to produce a precoding vector $E[|h_{k,m}|] \cdot \mu_{m,1} p_m$ for the m-th DAP. In the case of the CI-DAP MIMO mode, as at least two values of $c_{m,1}$ are non-zero for each layer, one layer is joint-precoded and transmitted at least two DAPs.

Step 68 for the CI-DAP MIMO mode is identical to step 68 for the NCI-DAP MIMO mode described herein above.

E. Determination and Sharing of Active DAP Set

An active DAP set for a UE indicates a set of DAPs having channel states sufficient for influencing downlink data transmission performance. The eNodeB and each UE determine and share an active DAP set $A_k$.

The UE feeds intra-DAP channel state information and estimated CQI information for DAPs in the active DAP set back to the eNodeB. On the basis of the active DAP set, the eNodeB performs layer-to-DAP mapping at step 66 of FIG. 6.

Selection of an optimum active DAP set for a UE is heavily influenced by pathloss and fast fading between the UE and DAPs. Pathloss including shadow fading may determine the average channel gain that a UE may have. Fast fading may cause a maximum change of −30 to 5 dB in the received signal level of the UE on a short-term basis. Hence, selection of an optimum active DAP set for a UE should be made in consideration of both the average channel gain and fast fading. To achieve this optimum selection, according to an embodiment of the present invention, a candidate DAP set of $M_c (\leq M)$ DAPs for a UE is formed from all DAPs in consideration of average channel gains and shared between the UE and the eNodeB on a long-term basis; and an active DAP set is formed by selecting DAPs from the candidate DAP set in consideration of fast fading and shared between the UE and the eNodeB on a short-term basis.

Formation and sharing of the candidate DAP set between the eNodeB and a UE according to an embodiment of the present invention is described as follows.

The eNodeB directly estimates the average channel gain or receives average channel gain information as feedback on a long-term basis and forms a candidate DAP set $C_k$ of $M_c (\leq M)$ DAPs according to Equation (7), as follows:

$$\begin{cases} \dfrac{E[|h_{k,m}|]}{\max\{E[|h_{k,m}|]\}_{m=1,\ldots,M}} \geq \gamma_{th}, m \in C_k \\ \dfrac{E[|h_{k,m}|]}{\max\{E[|h_{k,m}|]\}_{m=1,\ldots,M}} < \gamma_{th}, m \notin C_k \end{cases} \quad \text{Equation (7)}$$

In the above Equation (7), $\max\{E[|h_{k,m}|]\}_{m=1,\ldots,M}$ indicates the maximum of average channel gains for M DAPs. When the average channel gain for the m-th DAP is greater than or equal to $\gamma_{th}$ times $\max\{E[|h_{k,m}|]\}_{m=1,\ldots,M}$, the m-th DAP belongs to the candidate DAP set $C_k$. The candidate DAP set $C_k$ may be updated periodically or be updated irregularly when a significant change occurs in the estimated average channel gain $E[|h_{k,m}|]$. The value of $\gamma_{th}$ and the number of DAPs in the candidate DAP set $C_k$ may be fixed and shared between the eNodeB and UEs.

A1. In order to share information on the formed candidate DAP set $C_k$ with the k-th UE, the eNodeB sends the information to the k-th UE through the downlink control channel.

A2. In order to ensure correctness of the candidate DAP set $C_k$, the k-th UE feeds information on the received $C_k$ back to the eNodeB through the uplink feedback channel.

A3. When no error is found in the feedback information on the candidate DAP set $C_k$, the eNodeB sends a confirmation message to the k-th UE. When an error is found, steps A1 to A3 are repeated.

After information on the candidate DAP set $C_k$ is shared on a long-term basis between the eNodeB and the UE, formation and sharing of the active DAP set therebetween on a short-term basis are performed as follows.

The UE estimates the instantaneous channel gain $|h_{k,m}|$ including the average channel gain for a DAP in every slot or sub-frame and forms the active DAP set $A_k$ according to Equation (8), as follows:

$$\begin{cases} \dfrac{|h_{k,m}|}{\max\{|h_{k,m}|\}_{m \in C_k}} \geq \beta_{th}, m \in A_k \\ \dfrac{|h_{k,m}|}{\max\{|h_{k,m}|\}_{m \in C_k}} < \beta_{th}, m \notin A_k \end{cases} \quad \text{Equation (8)}$$

In Equation (8), $\max\{|h_{k,m}|\}_{m \in C_k}$ indicates the maximum of instantaneous channel gains for DAPs belonging to the candidate DAP set. When the instantaneous channel gain $|h_{k,m}|$ for the m-th DAP in the candidate DAP set is at least equal to $\beta_{th}$ times $\max\{|h_{k,m}|\}_{m \in C_k}$, the m-th DAP belongs to the active DAP set $A_k$. The active DAP set $A_k$ may be updated regularly in a short period, or be updated irregularly when a significant change occurs in the instantaneous channel gain $|h_{k,m}|$. The value of $\beta_{th}$ and the number of DAPs in the active DAP set $A_k$ may be fixed and shared between the eNodeB and UEs.

B1. The UE sends information on the active DAP set $A_k$ to the eNodeB through an uplink short-term feedback channel.

B2. In order to ensure correctness of the active DAP set $A_k$, the eNodeB sends information on the received $A_k$ back to the corresponding UE through the downlink control channel.

B3. When no error is found in the received information on the active DAP set $A_k$, the UE sends a confirmation message to the eNodeB. When an error is found, steps B1 to B3 are repeated.

Overall operations of the eNodeB and a UE according to an embodiment of the present invention are described as follows with reference to FIGS. 6 and 7.

Referring to FIG. 6, the eNodeB determines active DAPs for a UE among many DAPs distributed in the service area, and shares information on the active DAPs with the UE, in step 61. Here, determination of active DAPs is made in consideration of pathloss and fading characteristics between DAPs and the UE. The eNodeB determines a MIMO mode for the UE, and notifies the UE of the determined mode, in step 62. Here, the MIMO mode may be an NCI-DAP MIMO mode in which one active DAP is used for signal transmission to the UE or a CI-DAP MIMO mode in which at least two active DAPs are used for signal transmission to the UE.

The UE sends feedback information to the eNodeB according to the MIMO mode indicated in the notification, in step 63. When the NCI-DAP MIMO mode is used, the feedback information includes active DAP index information, intra-DAP channel state information, and SINR information from active DAPs to the UE. When the CI-DAP MIMO mode is used, the feedback information includes active DAP index information, downlink channel state information from active DAPs to the UE, SINR information from active DAPs to the UE, and information on average channel gains and instantaneous complex channel gains between active DAPs.

The eNodeB receives feedback information for the MIMO mode from the UE, in step 64, performs scrambling, modulation mapping and layer mapping on a signal to be sent to the UE, in step 65, and maps layers for the UE to active DAPs, in step 66.

The eNodeB determines a precoding vector and performs precoding of a signal, in step 67. When using the NCI-DAP MIMO mode, an inter-DAP precoding vector is determined in a preset manner and an intra-DAP precoding vector is determined according to intra-DAP channel state information. When using the CI-DAP MIMO mode, an inter-DAP precoding vector is determined on the basis of the product of average channel gains and instantaneous complex channel gains between active DAPs, and an intra-DAP precoding vector is determined according to intra-DAP channel state information. The precoding vector is determined by multiplying the inter-DAP precoding vector and the intra-DAP precoding vector. Thereafter, the eNodeB performs resource element mapping, generates OFDM signals and sends the OFDM signals through active DAPs, in step 68. The UE may receive a signal from the eNodeB.

Referring to FIG. 7, the eNodeB includes a scrambler 71, a modulation mapper 72, a layer mapper 73, a DAP mapper 74, precoders 75 and 76, resource element mappers 77 and 78, and OFDM signal generators 79 and 80. Although not shown, the eNodeB further includes a port determiner, a mode determiner, and a vector determiner.

The port determiner determines active DAPs for a UE among many DAPs distributed in the service area, and shares information on the active DAPs with the UE. In the present example according to an embodiment of the present invention, determination of active DAPs is made in consideration of pathloss and fading characteristics between DAPs and the UE.

The mode determiner determines a MIMO mode for the UE and notifies the UE of the determined MIMO mode. Here, the MIMO mode may be an NCI-DAP MIMO mode in which one active DAP is used for signal transmission to the UE or a CI-DAP MIMO mode in which at least two active DAPs are used for signal transmission to the UE.

The vector determiner determines a precoding vector according to MIMO mode feedback information from the UE. In the case of the NCI-DAP MIMO mode, the feedback information includes active DAP index information, intra-DAP channel state information, and SINR information from active DAPs to the UE. The vector determiner determines an inter-DAP precoding vector in a preset manner and determines an intra-DAP precoding vector according to intra-DAP channel state information. In the case of the CI-DAP MIMO mode, the feedback information includes active DAP index information, downlink channel state information from active DAPs to the UE, SINR information from active DAPs to the UE, and information on average channel gains and instantaneous complex channel gains between active DAPs. The vector determiner determines an inter-DAP precoding vector on the basis of the product of average channel gains and instantaneous complex channel gains between active DAPs, and determines an intra-DAP precoding vector according to intra-DAP channel state information. The vector determiner determines the precoding vector by multiplying the inter-DAP precoding vector and the intra-DAP precoding vector. Thereafter, the precoder 75 or 76 performs precoding of a signal to be sent to the UE using the determined precoding vector.

Although not shown, a UE includes a control unit, a transmission unit, and multiple receive antennas.

The control unit shares information on active DAPs with the eNodeB. After receiving a notification of the determined MIMO mode from the eNodeB, the transmission unit sends feedback information for the MIMO mode to the eNodeB under control of the control unit. In the case of the NCI-DAP MIMO mode, the feedback information includes active DAP index information, intra-DAP channel state information, and SINR information from active DAPs to the UE. When using the CI-DAP MIMO mode, the feedback information includes active DAP index information, downlink channel state information from active DAPs to the UE, SINR information from active DAPs to the UE, and information on average channel gains and instantaneous complex channel gains between active DAPs. The receive antennas receive a signal from the active DAPs.

In a feature according to embodiments of the present invention, there is provided a scheme for achieving efficient and high-speed MIMO transmission using minimum feedback information in a downlink DAS environment employing numerous transmit antennas. This scheme is optimized to DAS downlink channel properties.

In the provided method, an active DAP set is formed by selecting DAPs having an sufficient channel gain for influencing MIMO transmission performance from among all DAPs having different channel gains, and downlink channel state information related only with DAPs belonging to the active DAP set is fed back to the transmitter. In consideration of channel states and distribution of UEs in the cell, the eNodeB selects an optimum MIMO mode for a specific UE among NCI-DAP and CI-DAP MIMO modes, and operates according to the selected MIMO mode. The transmitter operates in an NCI-DAP MIMO mode or a CI-DAP MIMO mode according to the type of feedback information.

In the NCI-DAP MIMO mode, one layer signal is transmitted by only one DAP selected from among multiple DAPs. The eNodeB collects, for a UE, feedback information regarding the active DAP set, intra-DAP channel states of DAPs in the active DAP set, and downlink CQI from DAPs in the active DAP set to the UE.

In the CI-DAP MIMO mode, inter-DAP joint precoding is performed to compensate for channel differences between a UE and DAPs, and one layer signal is simultaneously transmitted by two or more DAPs. The eNodeB collects, for a UE, feedback information regarding the active DAP set, intra-DAP channel states of DAPs in the active DAP set, downlink CQI from DAPs in the active DAP set to the UE, and channel states between DAPs in the active DAP set (inter-DAP channel state information).

Although embodiments of the present invention have been described in detail hereinabove, it should be understood that many variations and modifications of the basic inventive concept described herein will still fall within the spirit and scope of the present invention as defined in the appended claims.

What is claimed is:

1. A transmission method for a base station in a wireless communication system, comprising:
   determining active antenna ports, for a User Equipment (UE) having multiple receive antennas, from among a plurality of Distributed Antenna Ports (DAPs) placed in a service area;
   assigning one of a non-cooperative Multiple-Input and Multiple-Output (MIMO) mode in which one active antenna port is used for signal transmission to the UE and a cooperative MIMO mode in which at least two active antenna ports are used for the signal transmission to the UE,
   notifying the MIMO mode assignment to the UE;
   determining a signal precoding vector on a basis of feedback information for the MIMO mode received from the UE; and
   precoding a signal using the signal precoding vector and transmitting the precoded signal through the active antenna ports,
   wherein, when the assigned MIMO mode is the non-cooperative MIMO mode, determining the signal precoding vector comprises:
      determining an inter-port precoding vector in a preset manner to compensate for differences between the active antenna ports;
      determining an intra-port precoding vector according to channel state information; and
      producing the signal precoding vector, based on the inter-port precoding vector and the intra-port precoding vector.

2. The transmission method of claim 1, wherein the one of the non-cooperative MIMO mode and the cooperative MIMO mode is assigned based on average channel gains between each active antenna port and the UE.

3. The transmission method of claim 1, wherein the feedback information includes active antenna port index information, downlink channel state information corresponding to channels sent from the active antenna ports to the UE, and Signal-to-Interference plus Noise Ratio (SINR) information corresponding to the channels sent from the active antenna ports to the UE.

4. The transmission method of claim 3, wherein, when the assigned MIMO mode is the cooperative MIMO mode, the feedback information further includes information corresponding to average channel gains and instantaneous complex channel gains between the active antenna ports.

5. The transmission method of claim 1, wherein, when the assigned MIMO mode is the cooperative MIMO mode, determining the signal precoding vector comprises:
   determining an inter-port precoding vector on a basis of a product of average channel gains and instantaneous complex channel gains between the active antenna ports;
   determining an intra-port precoding vector according to channel state information; and
   producing the signal precoding vector based on the inter-port precoding vector and the intra-port precoding vector.

6. The transmission method of claim 1, wherein the active antenna ports are determined in consideration of pathloss and fading characteristics between the plurality of DAPs and the UE.

7. A transmission apparatus for a base station in a wireless communication system, comprising:
a plurality of distributed antenna ports (DAPs) placed in a service area for transmitting signals; and
a controller configured to control to assign one of a non-cooperative Multiple-Input and Multiple-Output (MIMO) mode in which one active antenna port is used for signal transmission to the UE and a cooperative MIMO mode in which at least two active antenna ports are used for the signal transmission to the UE, to notify the MIMO mode assignment to the UE, to determine a signal precoding vector based on feedback information for the MIMO mode received from the UE, to precode a signal using the signal precoding vector, and to transmit the precoded signal through the active antenna ports,
wherein the controller is further configured to, when the assigned MIMO mode is the non-cooperative MIMO mode, determine the signal precoding vector by:
determining an inter-port precoding vector in a preset manner to compensate for differences between the active antenna ports;
determining an intra-port precoding vector according to channel state information; and
producing the signal precoding vector based on the inter-port precoding vector and the intra-port precoding vector.

8. The transmission apparatus of claim 7, wherein the controller is further configured to assign the one of the non-cooperative MIMO mode and the cooperative MIMO mode based on average channel gains between each active antenna port and the UE.

9. The transmission apparatus of claim 7, wherein the feedback information includes active antenna port index information, downlink channel state information corresponding to channels sent from the active antenna ports to the UE, and Signal to Interference plus Noise Ratio (SINR) information corresponding to the channels sent from the active antenna ports to the UE.

10. The transmission apparatus of claim 9, wherein, when the assigned MIMO mode is the cooperative MIMO mode, the feedback information further includes information corresponding to average channel gains and instantaneous complex channel gains between the active antenna ports.

11. The transmission apparatus of claim 7, wherein the controller is further configured to, when the assigned MIMO mode is the cooperative MIMO mode, determine the signal precoding vector by:
determining an inter-port precoding vector based on a product of average channel gains and instantaneous complex channel gains between the active antenna ports,
determining an intra-port precoding vector according to channel state information, and
producing the signal precoding vector based on the inter-port precoding vector and the intra-port precoding vector.

12. The transmission apparatus of claim 7, wherein the controller is further configured to determine the active antenna ports according to pathloss and fading characteristics between the plurality of DAPs and the UE.

13. A reception method for a UE having a plurality of receive antennas in a wireless communication system, comprising:
sharing, with a base station, information regarding active antenna ports, selected from among a plurality of Distributed Antenna Ports (DAPs) evenly placed in a service area;
transmitting, after receiving a notification of a Multiple-Input and Multiple-Output (MIMO) mode, which is one of a non-cooperative MIMO mode in which one active antenna port is used for signal transmission to the UE and a cooperative MIMO mode in which at least two active antenna ports are used for the signal transmission to the UE for communication from the base station, feedback information for the notified MIMO mode to the base station; and
receiving, from the base station, a signal, which is precoded using a signal precoding vector determined according to the feedback information and sent through the active antenna ports,
wherein, when the MIMO mode is the non-cooperative MIMO mode, the base station determines an inter-port precoding vector in a preset manner to compensate for differences between the active antenna ports and determines an intra-port precoding vector according to channel state information, produces the signal precoding vector based on the inter-port precoding vector and the intra-port precoding vector, and transmits the produced signal precoding vector to the UE.

14. The reception method of claim 13, wherein the feedback information includes active antenna port index information, downlink channel state information corresponding to channels sent from the active antenna ports to the UE, and Signal-to-Interference plus Noise Ratio (SINR) information from the active antenna ports to the UE.

15. The reception method of claim 14, wherein, when the notified MIMO mode is the cooperative MIMO mode, the feedback information further includes information corresponding to average channel gains and instantaneous complex channel gains between the active antenna ports.

16. A reception apparatus for a User Equipment (UE) in a wireless communication system, comprising:
a control unit for sharing, with a base station, information regarding active antenna ports, selected from among many Distributed Antenna Ports (DAPs) placed in a service area;
a transmission unit transmitting, to the base station, after receiving a notification of a Multiple-Input and Multiple-Output (MIMO) mode, which is one of a non-cooperative MIMO mode in which one active antenna port is used for signal transmission to the UE and a cooperative MIMO mode in which at least two active antenna ports are used for the signal transmission to the UE for communication from the base station, feedback information for the notified MIMO mode; and
a plurality of receive antennas each receiving a signal from the base station under a control of the control unit, such that the signal is precoded using a signal precoding vector determined according to the feedback information and sent through the active antenna ports,
wherein, when the notified MIMO mode is the non-cooperative MIMO mode, the base station determines an inter-port precoding vector in a preset manner to compensate for differences between the active antenna ports and determines an intra-port precoding vector according to channel state information, produces the signal precoding vector based on the inter-port precoding vector and the intra-port precoding vector, and transmits the produced signal precoding vector to the UE.

17. The reception apparatus of claim 16, wherein the feedback information includes active antenna port index information, downlink channel state information corresponding to channels sent from the active antenna ports to the UE, and Signal-to-Information plus Noise Ratio (SINR) information from the active antenna ports to the UE.

18. The reception apparatus of claim 17, wherein, when the notified MIMO mode is the cooperative MIMO mode, the feedback information further includes information corresponding to average channel gains and instantaneous complex channel gains between the active antenna ports.

* * * * *